United States Patent
Chady et al.

[11] Patent Number: 6,091,228
[45] Date of Patent: Jul. 18, 2000

[54] CONTROL SYSTEM FOR, IN THE PRESENCE OF A VARYING SYSTEM LOAD, ESTABLISHING GENERATOR CURRENT TO MAINTAIN A PARTICULAR BATTERY CHARGE STATE

[75] Inventors: Christine Marie Chady, Endicott; Arthur Paull Lyons, Maine; Timothy Michael Grewe, Endicott, all of N.Y.

[73] Assignee: Lockheed Martin Corp., Johnson City, N.Y.

[21] Appl. No.: 09/177,011

[22] Filed: Oct. 22, 1998

Related U.S. Application Data

[60] Provisional application No. 60/083,399, Apr. 29, 1998.

[51] Int. Cl.[7] .......................... H01M 10/44; H01M 10/46
[52] U.S. Cl. .................................. 320/132; 320/DIG. 21; 324/430
[58] Field of Search ..................................... 320/103, 104, 320/127, 128, 132, DIG. 21; 324/427, 428, 430, 432, 433; 340/636

[56] References Cited

U.S. PATENT DOCUMENTS

| | | | |
|---|---|---|---|
| 3,895,284 | 7/1975 | Schweizer et al. | 320/134 |
| 4,433,278 | 2/1984 | Lowndes et al. | 320/116 |
| 4,937,528 | 6/1990 | Palanisamy | 324/430 |
| 5,488,300 | 1/1996 | Jamieson | 324/432 |
| 5,659,240 | 8/1997 | King | 320/134 |

*Primary Examiner*—Edward H. Tso
*Attorney, Agent, or Firm*—W. H. Meise; G. H. Krauss

[57] ABSTRACT

A controller for a hybrid electric system such as a hybrid electric vehicle includes a load, a battery, and a controllable source of auxiliary electricity. The state of charge (SOC) of the battery is estimated, and an error signal is generated which represents the difference between a desired and actual SOC. The SOC error signal is processed by at least integration, to produce a source signal representing the desired auxiliary source current. A second error signal is generated between the actual current from the auxiliary source and the desired current from the auxiliary source. The second error signal is processed, at least by integration, to produce a control signal for controlling the auxiliary signal source.

17 Claims, 3 Drawing Sheets

CONTROL SYSTEM FOR, IN THE PRESENCE OF A VARYING SYSTEM LOAD, ESTABLISHING GENERATOR CURRENT TO MAINTAIN A PARTICULAR BATTERY CHARGE STATE

This application claims priority of Provisional Patent Application Ser. No. 60/083,399, filed Apr. 29, 1998.

FIELD OF THE INVENTION

This invention relates to hybrid electric systems, including an electrically powered load, a battery, and a controllable electric power source, and more specifically to hybrid electric vehicles with control systems for controlling the charging of the batteries from a rotational engine/generator in dependence upon the state of charge of the batteries.

BACKGROUND OF THE INVENTION

In the control of a hybrid electric vehicle which includes a traction motor, a traction battery (which may include many individual battery elements), and an engine-driven electrical generator for charging the battery, it has been found that a simple battery charge controller which responds to the battery voltage fails to maintain the batteries at a controlled charge level, in that the batteries slowly discharge during operation, due to the action of control system integrators in the presence of a fluctuating battery or bus voltage. Also, such a simple controller is inefficient from an energy standpoint, in that the battery operating point cannot be controlled, which is equivalent to saying that the battery impedance cannot be controlled.

Improved battery charge control methods are desired for hybrid electric vehicles.

SUMMARY OF THE INVENTION

A method is described for controlling the state of charge of a battery of a hybrid electric vehicle around a set state of charge which is less than full charge. Control is accomplished by controlling an electrical power generator, which may be an engine/generator combination, fuel cell, solar cell, or the like. The method includes the step of estimating the state of charge of the battery, to thereby generate a signal representative of the existing (or present or current) state of charge of the battery. A signal is generated which is representative of the desired state of charge of the battery, which is a state of less than full charge. The difference is taken between the signal representative of the existing state of charge and the signal representative of the desired state of charge, to thereby generate a state-of-charge error signal. The state-of-charge error signal is processed by at least integration, to produce a desired generator current signal representative of the desired generator current. The generator current is sensed to produce an existing generator current signal. The difference is taken between the existing generator current signal and the desired generator current signal, to thereby produce a generator-current error signal. The generator-current error signal is processed, by at least integration, to produce a generator output current command. The generator current output is controlled by the generator output current command. In another equivalent method according to the invention, the battery impedance is maintained at a predetermined value, rather than the state of charge. The battery impedance may be determined by taking the quotient of the bus or battery voltage divided by its discharge current. The battery voltage and discharge current may be averaged.

In a particular version of the method according to the invention, the step of controlling the electrical current output includes the step of controlling the electrical current production of a fuel cell, and in another version, it includes the step of controlling the engine speed of a rotary-engine-driven electrical generator.

In a particular manifestation of the invention, the step of processing the state-of-charge error signal includes the further step of multiplication of the integrated state-of-charge signal by the vehicle load current to produce a multiplied integrated state-of-charge error signal.

In a particular embodiment of the invention, the step of processing the multiplied integrated state-of-charge error signal includes the further steps of generation of a low-battery state signal, and addition of the low-battery state signal to the multiplied integrated state-of-charge error signal. In a particular version of this embodiment, the step of generation of a low-battery state signal includes the step of limiting the state-of-charge error signal to produce a limited state-of-charge error signal, and multiplying the limited state-of-charge error signal by a gain value.

In one avatar, the step of estimating the state of charge of the battery includes the step of integrating the sum of the existing generator current and the load current.

The step of controlling the electrical current output of the generator in response to the generator output current command may include the step of applying the generator output current command signal to control the rotational speed of an internal combustion engine coupled to a rotary electrical generator.

An apparatus according to an aspect of the invention controls the charge state of a battery associated with a controllable auxiliary source of electrical power and a load. The apparatus includes the battery, and a state-of-charge estimator associated with the battery. A load current sensor is coupled to the load. The apparatus also includes a controllable electrical source, and a source current sensor coupled to the controllable electrical source, for generating a source current signal representing the current generated by the controllable electrical source. A power conveying means is coupled to the battery, the load, and to the controllable electrical source, for allowing power to flow to the load from the battery, the electrical source, or both the battery and the electrical source.

In accordance with an aspect of the invention, a source of signal produces a signal representing a desired state of battery charge. A first error signal generator is coupled to the state-of-charge estimator and to the source of signal representing a desired state of battery charge, for taking the difference between the signals, for thereby generating a state-of-charge error signal. A first processing arrangement is coupled to the first error signal generator, for processing the state-of-charge error signal by at least integrating the state-of-charge error signal, to thereby produce a desired-source-signal representing the current to be produced by the controllable electrical source. A second error signal generator is coupled to the first processing arrangement and to the source current sensor, for taking the difference between the desired-source-signal and the source current signal, to thereby generate a source current error signal. A second processing arrangement is coupled to the second error signal generator, for processing the source current error signal by at least integration, to thereby produce a controllable electrical source control signal. A coupling arrangement is coupled to the second processing arrangement and to the controllable electrical source, for coupling the controllable electrical source control signal to the controllable electrical source for control thereof.

According to a more particular embodiment of the invention, the first processing arrangement includes a first switching arrangement. The first switching arrangement includes a control port, first and second switchable ports, and a common port to which one of the first and second switchable ports is connected under control of a logic signal applied to the control port (320c). A first path is coupled to the first error signal generator and to the first switchable port of the first switching arrangement. The first path includes a first integrator for integrating the state-of-charge error signal with a speed controlled by a first constant, to produce a first integrated state-of-charge signal. A source of a constant signal is coupled to the second switchable port of the first switching arrangement. The constant signal represents a fixed percentage of the load current. In one embodiment of the invention, the fixed percentage may be 100% of the load current. A fast integrator is coupled to the first error signal generator, for at least integrating the state-of-charge error signal with a speed controlled by a second constant, which second constant is greater than the first constant of the first integrator, to generate a second integrated state-of-charge signal. A source of signal is provided, for producing a signal representing 100% of the load current. A summing circuit includes an inverting input port coupled to the fast integrator, and also includes a noninverting input port coupled to the source of signal representing 100% of the load current, for summing the signals applied to the summing circuit, to thereby produce signals representing that portion of the load current which is to be supplied by the battery. A signal comparison arrangement is coupled to the summing circuit and to the load current sensor, for comparing signals representative of the load current with the signals representing that portion of the load current which is to be supplied by the battery, and for, in response to the comparison, producing a first logic level, and for coupling the first logic level to the control input port of the first switching arrangement when the load current is the greater, and for producing a second logic level, and for coupling the second logic level to the control input port, when the signal representing that portion of the load current which is to be supplied by the battery is the greater, for thereby causing the switching arrangement to couple the common port to the first switchable port when the load current is the larger, and for causing the switching arrangement to couple the common port to the second switchable port when the signal representing that portion of the load current which is to be supplied by the battery is the greater. A summing arrangement includes a first input port coupled to the load current sensor and also includes a second input port, for summing together the signal representative of the load current with a signal applied to the second input port of the summing arrangement, to thereby produce the desired-source-current signals. A multiplying arrangement is coupled to the common port of the first switching arrangement and to the second input port of the summing arrangement, for multiplying by the load current signals that one of (a) the integrated state-of-charge signals and (b) the signals representing a fixed percentage of the load current which is coupled to the common port of the first switching arrangement.

In a particular embodiment of the invention, the first integrator is a state-limited integrator. In another particular embodiment, the first processing arrangement further includes a limiter coupled to the summing arrangement and to the noninverting input port of the second error signal generator, for limiting the desired-source-current signal applied to the second error signal generator. In yet another embodiment of the invention, the first processing arrangement further includes a source of signal representing the maximum current which is to be drawn from the battery, and a multiplier coupled to the summing circuit and to the source of signal representing the maximum current, for multiplying the signal representing that portion of the load current which is to be supplied by the battery by the signal representing the maximum current.

A major advantage of the arrangement and method according to the invention is that the battery may be constantly maintained at a state of charge which is less than the full-charge condition. This, in turn, means that regenerative braking, which returns energy to the battery, can be used under most operating conditions of an electrically-driven vehicle, without harming the battery by overcharging. The ability to use regenerative braking under most conditions, in turn, tends to result in high operating efficiency.

DESCRIPTION OF THE INVENTION

Figure 1:
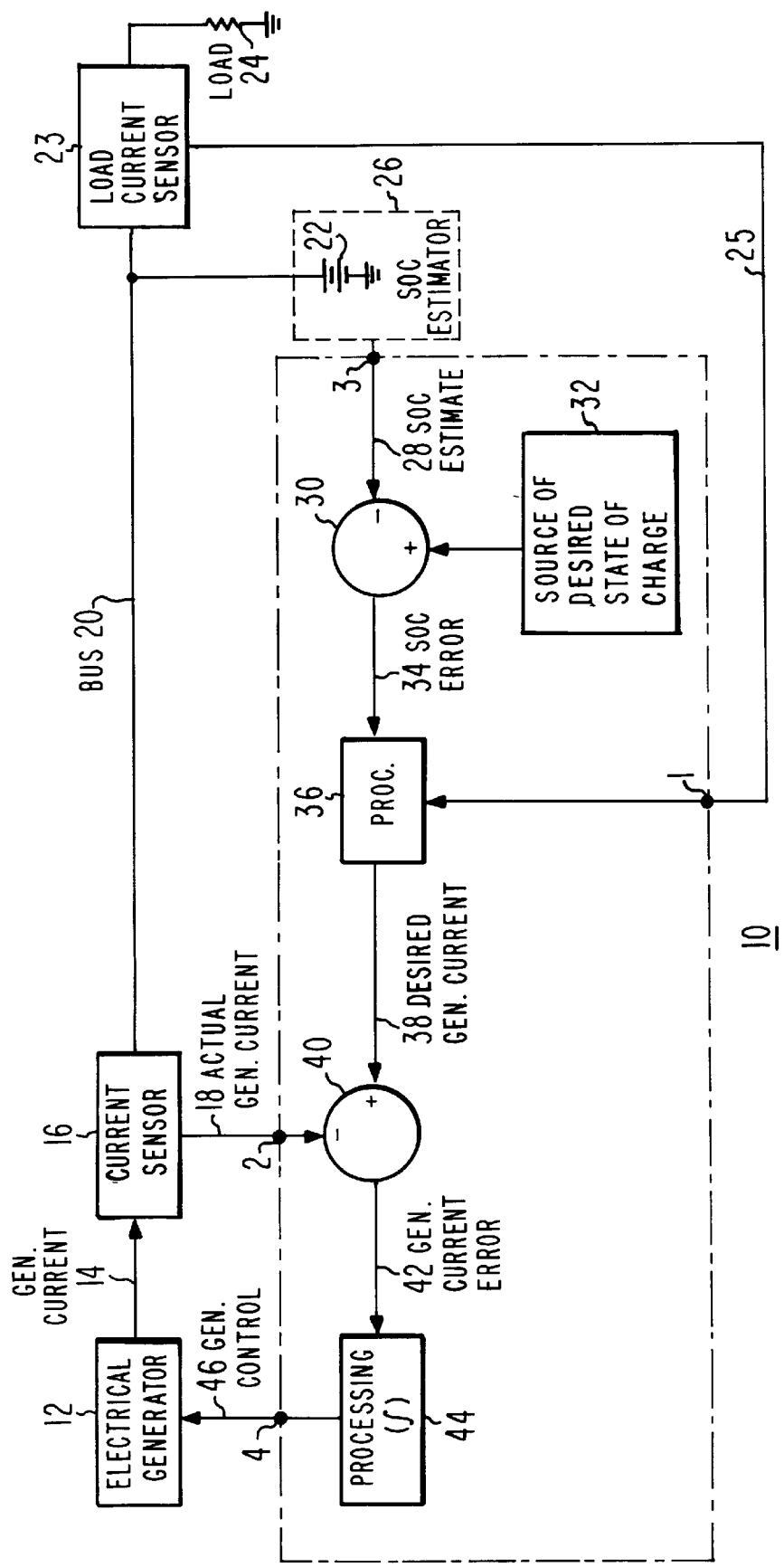
FIG. 1 is a simplified block diagram of a system according to an aspect of the invention, including a battery charge estimation portion.

FIG. 1 is a simplified block diagram of a system in accordance with an aspect of the invention. In FIG. 1, the system may be a hybrid electric vehicle 10, which includes an electrical generator 12. In one embodiment of the invention, electrical generator 12 may be a rotary internal combustion engine coupled to a rotary electrical generator. Current produced by generator 12 is applied over a path 14 to a Hall-effect generator current sensor 16, which samples the generator current to produce a signal representing the instantaneous generator current on a path 18. The generator current is applied from sensor 16 over a bus 20 to a traction battery illustrated by a battery symbol 22 connected in parallel with the series combination of a load current sensor 23 and a load 24, which in a particular embodiment of the invention is a traction motor for the hybrid electric vehicle 10.

According to an aspect of the invention, a battery state-of-charge estimator is provided, which is illustrated in FIG. 1 as being within a dashed box 26 associated with battery 22. State-of-charge estimator 26 produces, on a signal path 28, a signal representing an estimate of the state of charge of the battery 22. The signal on signal path 28 is applied to a processing arrangement depicted as being within a dot-dash outline 29. An error signal generator 30 takes the difference between the state-of-charge estimate received over signal path 28 and a signal representing the desired state of charge, which is generated by a block 32, to produce a state-of-charge error signal on a signal path 34. The state-of-charge error signal is processed in a block 36 by at least integrating, to produce, on a signal path 38, a signal representing the desired current which generator 12 is to generate.

A further error signal generator 40 receives the signal representing the desired generator current from signal path 38, and also receives the signal representing the generator current from signal path 18, and takes the difference therebetween, in order to produce a generator current error signal on a signal path 42. Further processing, including at least integration, is performed in a processing block 44, to produce a generator control signal. The generator control signal is applied over a signal path 46 to control the electrical current output of the electrical generator 12. In the context of an engine/generator, the generator control signal commands the engine speed.

As mentioned, the electrical generator, in the context of a hybrid electric vehicle, may be an engine/generator combination. In this context, the load 24 is a traction motor for propelling the vehicle, and the battery is a traction battery. The traction battery may or may not provide ancillary vehicle power, such as air conditioning, lighting, and the like, depending upon the presence or absence of an auxiliary battery for such purposes. It should be particularly noted that electrical generator block 12 may be a fuel cell rather than an engine/generator.

Figure 2:
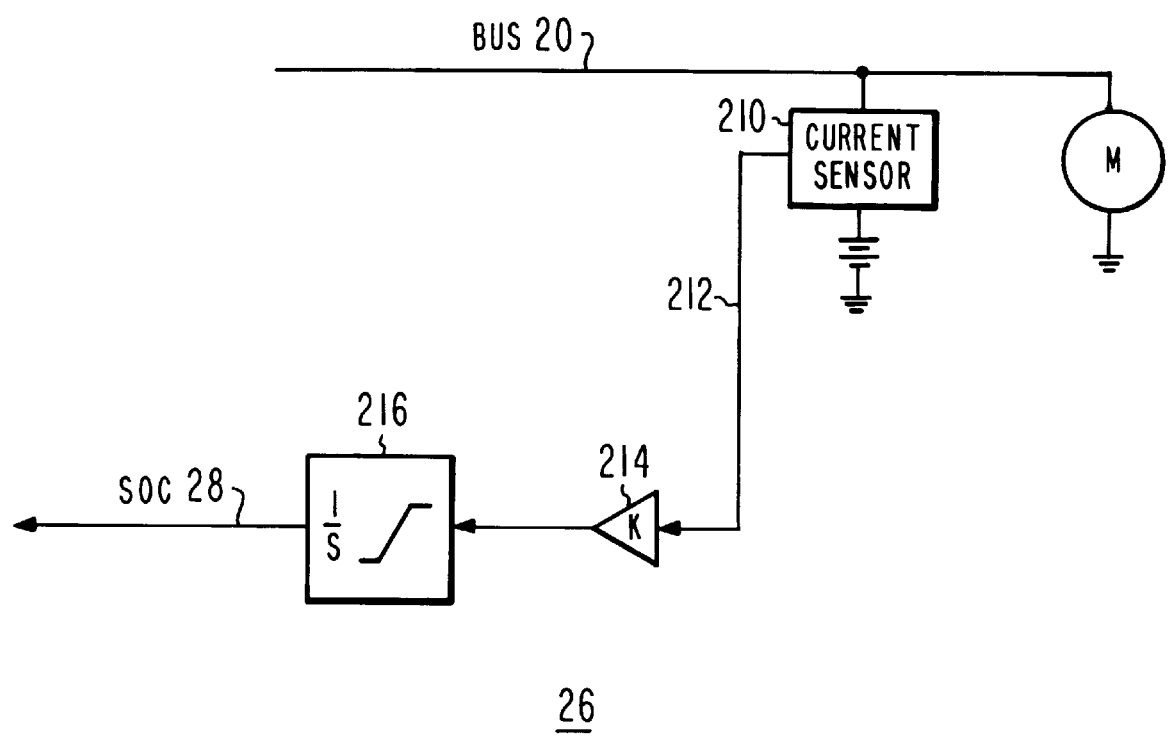
FIG. 2 is a simplified block diagram of the battery charge estimation portion of the system of FIG. 1.

FIG. 2 is a simplified block diagram of state-of-charge estimator 26 of FIG. 1. In FIG. 2, elements corresponding to those of FIG. 1 are designated by the same reference numerals. As illustrated in FIG. 2, a Hall-effect current sensor 210 measures the battery current, and produces a signal representative of battery current on a signal path 212. The signal representative of battery current is applied to a gain block 214 for multiplication by an integrator constant, and the multiplied battery current signal is then integrated (1/S) in a state-limited integrator 216, to produce the state-of-charge signal on signal path 28.

Figure 3:
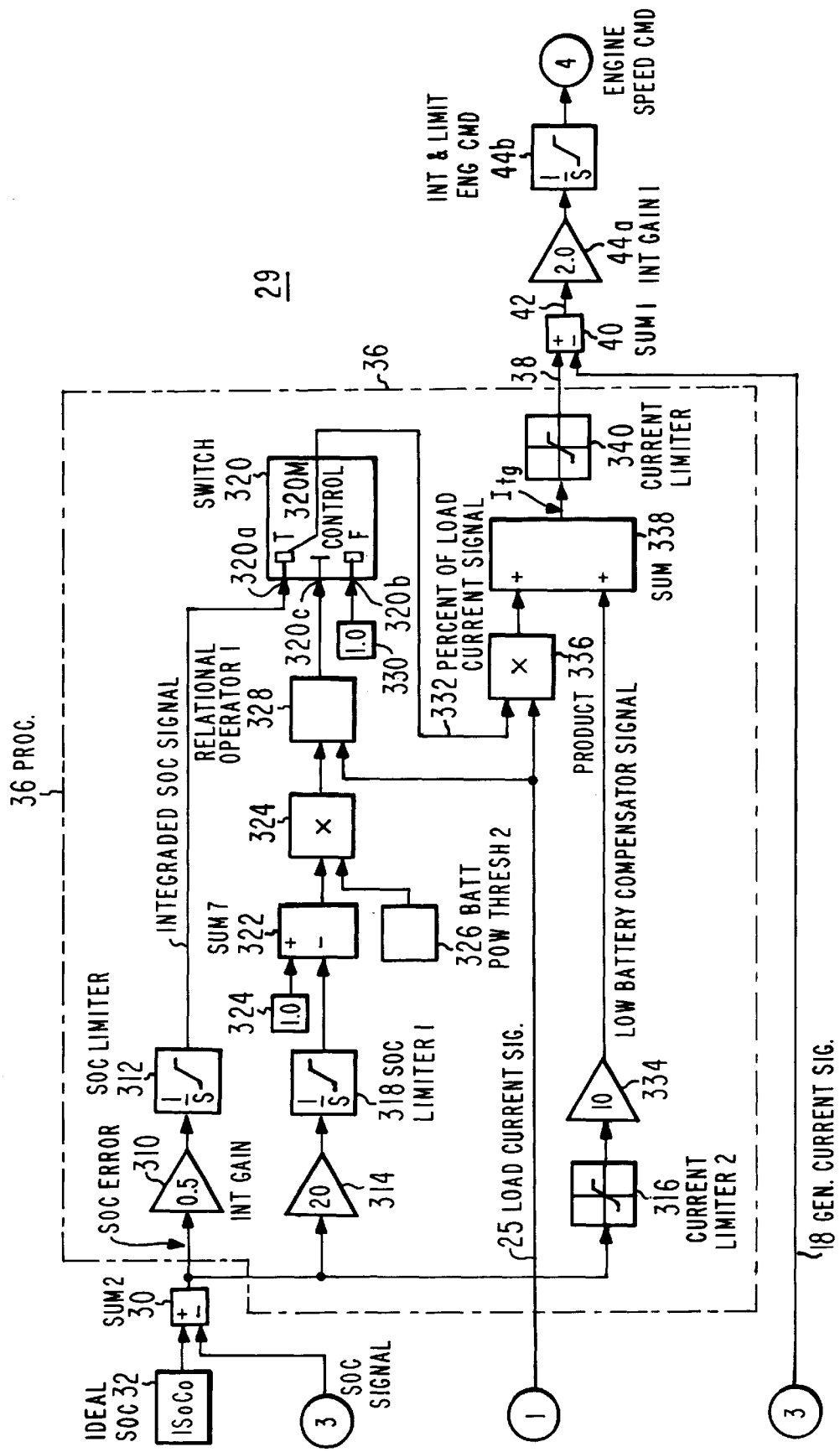
FIG. 3 is a more detailed, yet still simplified, block diagram of the processing portion of the arrangement of FIG. 1.

FIG. 3 is a simplified block diagram representing the processing arrangement of block 29 of FIG. 1. Elements of FIG. 1 which appear in FIG. 3 are designated by like reference numerals. In FIG. 3, the estimated state-of-charge (SOC) signal is applied from a terminal 3 at the left of the FIGURE over signal path 28 to an inverting (−) input port of summing circuit 30. The desired state of charge signal is generated in block 32, and is applied to the inverting input port of summing circuit 30. The state-of-charge error signal produced by summing circuit 30 is applied to a current limiter 316, a multiplier 314, and to a multiplier 310. Multiplier 310 multiplies the state-of-charge error signal by a constant which controls the integration speed of a state-limited integrator 312. The multiplied, state-limited integrated SOC error signal produced at the output port of state-limited integrator 312 is applied to a first contact 320a of a single-pole, double-throw switch illustrated by a mechanical switch symbol 320, which is controlled by the logic level appearing at its control input port 320c. Those skilled in the art know that the preferred implementation of a switch for purposes of a control system is a solid-state switch, rather than a mechanical switch.

The state-of-charge (SOC) error signal received by multiplier block 314 is multiplied by an integrator constant which is greater than the constant used in multiplier 310, for faster integration by a state-limited integrator 318, which limits the output values to lie between the values zero and one. The state-limited integrated output of state-limited integrator 318 is applied to an inverting input port of a summing circuit 322.

Summing circuit 322 of FIG. 3 sums the state-limited integrated signal with a value of unity or one produced by a generator 324. The value of unity produced by source or generator 324 may be viewed as representing the entirety of the load current, and the state-limited integrated signal from state-limited integrator 318 may be viewed as being related to the amount of current which the generator 12 (of FIG. 1) is to supply. The sum produced by summing circuit 322 represents the 100% of the load current minus the percentage of the load current which the state-limited integral represents, which is the load current which the battery must supply. More particularly, if the value of the state-limited integral at the output port of integrator 318 were 0.6, then it would represent 60% of the reference value of unity produced by source 324, and the resulting output of summing circuit 322 would be 0.4, representing 40% of the load current to be supplied by the batteries. Thus, the value produced at the output of summing circuit 322 represents the percentage or proportion of the load current which the batteries are to supply.

The output signal from summing circuit 322 is applied to a multiplier 324, in which the signal representing the percentage of the load current to be supplied by the battery is multiplied by a value produced by a battery power threshold signal generator 326, which represents the maximum power which the traction battery 22 (of FIG. 1) can supply. Thus, the percentage of the load current to be supplied by the battery as represented by the output signal from summing circuit 322 is multiplied by a value which represents the maximum power which the battery is permitted to supply, to produce a multiplied signal at the output of multiplier 324 which represents the current to be supplied by the battery. A comparator 328 is coupled to the multiplied output from multiplier 324 and to signal path 25 for receiving the load current signal, and produces a logic high or 1 if the multiplied output from multiplier 324 is less than the load current, and produces a logic zero otherwise. The resulting logic state is applied to control the state of switch 320. More particularly, if the multiplied output from multiplier 324 is less than the load current on path 25, comparator 328 produces a TRUE or logic high, which controls switch 320 to connect movable element 320M to the upper (T) contact, as illustrated in FIG. 3. Correspondingly, if the value of the multiplied output from multiplier 324 is greater in magnitude than the load current indicated by the signal on signal path 25, comparator 328 produces a FALSE or logic low, whereupon the movable element 320M connects to the F terminal rather than to the T terminal, thereupon coupling the unity or one signal produced by generator onto signal path 332.

The state-of-charge error signal produced by summing circuit 30 of FIG. 3 is limited in limiter 316, and multiplied by a constant in a multiplier 334. The output of multiplier 334 represents a compensator which increases the current command when the battery is at a low state of charge.

A multiplier 336 in FIG. 3 receives, over signal path 332, that one of the percent-of-load-current signals selected by switch 320, and also receives the load current signal, and multiplies them together, to produce a signal representing the amount of the load current which is to be provided by the generator. The signal from multiplier 336 is applied to a summing circuit 338, in which the signal representing the amount of the load current which is to be provided by the generator is summed with the compensator signal for increasing the generator current when the battery charge is low, thereby producing a signal representing the total generator current $I_{tg}$. The total generator current $I_{tg}$ is applied to a limiter circuit 340, which represents the maximum-generator-current limitation. The limited total generator current signal is applied from limiter circuit 340 to the noninverting input port of summing circuit 40, and the generator current representative signal is applied over signal path 18 to the inverting input port. Summing circuit 40 produces an error signal on signal path 42 representing the difference between the desired generator current and the actual generator current.

The generator current error signal produced by error signal generator 40 of FIG. 3 is applied to serially connected blocks 44a and 44b, which together represent the gain of the state-limited integrator and the state-limited integrator itself, respectively. The integrated signal at the output of state-limited integrator 44b is applied over signal path 46 to terminal 4, for controlling the output current of generator 12 of FIG. 1. In the context of an engine/generator combination, this signal controls the engine speed of the engine/generator combination.

While the abovedescribed method estimates the state of charge of the battery by integrating the input and output currents, the state of charge can be estimated by measuring the battery impedance or resistance, which is accomplished by measuring the battery voltage or a battery-related voltage such as the bus voltage simultaneously with measurement of the battery discharge current, and determining the average quotient $$R = \frac{\frac{V_1 + V_2}{2}}{\frac{i_1 + i_2}{2}} \qquad 1$$

where $V_{1\ and\ V_2}$ are the battery-related voltage during battery discharge sample intervals 1 and 2; and $i_1$ and $i_2$ are the corresponding battery discharge currents during corresponding sample intervals 1 and 2, respectively.

Other embodiments of the invention will be apparent to those skilled in the art. For example, while the control system of the invention has been described in the context of a hybrid electric vehicle, it may be used in any system which includes batteries, a load, and an electrical power source for recharging the battery. While the load in the described example is a direct-current load, an inverter may be connected electrically between the load and the bus when the load uses alternating current. In an actual embodiment of the invention, the load is a polyphase FOC induction motor, but details of the motor drive are not necessary to an understanding of the invention. While the method according to the invention may be performed by dedicated hardware, the preferred implementation of the signal processing is by software; in particular, the switch 320 is preferably a software switch. While the digital or analog nature of the controllers has not been described, digital processing is preferred for most purposes. While digital signals may be serial or parallel, processing speed considerations make parallel processing more desirable, but some elements of the system may be limited to serial data, in which case appropriate conversion must be used. While the current sensors have been described as a Hall-effect, other types of sensors can be used.

Thus, a method according to the invention is described for controlling the state of charge of a battery (22) of a hybrid electric vehicle (10) around a set state of charge which is less than full charge. Control is accomplished by controlling an electrical power generator (12), which may be an engine/generator combination, fuel cell, solar cell, or the like. The method includes the step of estimating the state of charge of the battery (22), to thereby generate (on signal path 28) a signal representative of the existing or present state of charge of the battery (22). A signal is generated (by a block 32) which is representative of the desired state of charge of the battery (22), which is a state less than full charge. The difference is taken (summing circuit 30) between the signal representative of the existing state of charge and the signal representative of the desired state of charge, to thereby generate (on signal path 34) a state-of-charge error signal. The state-of-charge error signal is processed (in block 36) by at least integration, to produce a desired generator (12) current signal (on a signal path 38) representative of the desired generator (12) current. The generator (12) current is sensed (by sensor 16) to produce an existing generator (12) current signal (on signal path 18). The difference is taken (in summing circuit 40) between the existing generator (12) current signal and the desired generator (12) current signal, to thereby produce a generator-current error signal (on signal path 42). The generator-current error signal is processed (in block 44), by at least integration, to produce a generator (12) output current command (on signal path 46). The generator (12) current output is controlled by the generator (12) output current command.

In a particular version of the method according to the invention, the step of controlling the electrical current output includes the step of controlling the electrical current production of a fuel cell, and in another version, it includes the step of controlling the engine speed of a rotary-engine-driven electrical generator.

In a particular manifestation of the invention, the step of processing the state-of-charge error signal includes the further step of multiplication (214) of the integrated state-of-charge signal by the vehicle (10) load current to produce a multiplied integrated state-of-charge error signal (on signal path 28). In a particular version of this manifestation of the invention, the step of processing the multiplied integrated state-of-charge error signal includes the further steps of generation of a low-battery state signal, and addition of the low-battery state signal to the multiplied integrated state-of-charge error signal. In a particular version of this embodiment, the step of generation of a low-battery state signal includes the step of limiting the state-of-charge error signal to produce a limited state-of-charge error signal, and multiplying the limited state-of-charge error signal by a gain value.

In one avatar, the step of estimating the state of charge of the battery (22) includes the step of integrating the sum of the existing generator (12) current and the load current.

The step of controlling the electrical current output of the generator (12) in response to the generator (12) output current command may include the step of applying the generator (12) output current command signal to control the rotational speed of an internal combustion engine coupled to a rotary electrical generator.

Further, an apparatus (10) according to an aspect of the invention controls the charge state of a battery (22) associated with a controllable auxiliary source (12) of electrical power and a load (24). The apparatus (10) includes the battery (22), and a state-of-charge estimator (26) associated with the battery (22). A load current sensor (23) is coupled to the load (24). The apparatus (10) also includes a controllable electrical source (12), and a source current sensor (16) coupled to the controllable electrical source (12), for generating a source current signal representing the current generated by the controllable electrical source (12). A power conveyor (20) is coupled to the battery (22), the load (24), and to the controllable electrical source (12), for allowing power to flow among the load (24), the battery (22), and the electrical source (12). A source of signal (32) produces a signal representing a desired state (less than full charge) of battery (22) charge. A first error signal generator (30) is coupled to the state-of-charge estimator (26) and to the source of signal (32) representing a desired state of battery (22) charge, for taking the difference between the (state-of-charge estimate and the desired state-of-charge) signals, for thereby generating a state-of-charge error signal. A first processor (36) is coupled to the first error signal generator (30), for processing the state-of-charge error signal by at least integrating the state-of-charge error signal, to thereby produce a desired-source-current signal representing the current to be produced by the controllable electrical source (12). A second error signal generator (40) is coupled to the first processor (36) and to the source current sensor (16), for taking the difference between the desired-source-current signal and the source current signal, to thereby generate a source current error signal. A second processor (44) is coupled to the second error signal generator (40), for processing the source current error signal by at least integration, to thereby produce a controllable electrical source (12) control signal. A coupling arrangement (46) is coupled to the second processor (44) and to the controllable electrical source (12), for coupling the controllable electrical source (12) control signal to the controllable electrical source (12) for controlling the controllable electrical source (12).

According to a more particular embodiment of the invention, the first processing arrangement (36) includes a first switching arrangement (320). The first switching arrangement includes a control port (320c), first (320a) and second (320b) switchable ports, and a common port (320M) to which one of the first (320a) and second (320b) switchable ports is connected under control of a logic signal applied to the control port (320c. A first path (310, 312) is coupled to the first error signal generator (30) and to the first switchable port (320a) of the first switching arrangement (320). The first path includes a first integrator (312) for integrating the state-of-charge error signal with a speed controlled by a first constant, to produce a first integrated state-of-charge signal. A source (330) of a constant signal is coupled to the second switchable port (320b) of the first switching arrangement (320). The constant signal represents a fixed percentage of the load current. In one embodiment of the invention, the fixed percentage may be 100% of the load current. A fast integrator (314, 318) is coupled to the first error signal generator (30), for at least integrating the state-of-charge error signal with a speed controlled by a second constant, which second constant is greater than the first constant of the first integrator, to generate a second integrated state-of-charge signal. A source of signal (324) is provided, for producing a signal representing 100% of the load current. A summing circuit (322) includes an inverting input port coupled to the fast integrator (314, 318), and also includes a noninverting input port coupled to the source of signal (324) representing 100% of the load current, for summing the signals applied to the summing circuit, to thereby produce signals representing that portion of the load current which is to be supplied by the battery. A signal comparison arrangement (328) is coupled to the summing circuit (322) and to the load current sensor (23), for comparing signals representative of the load current with the signals representing that portion of the load current which is to be supplied by the battery, and for, in response to the comparison, producing a first logic level, and for coupling the first logic level to the control input port (320c) of the first switching arrangement (320) when the load current is the greater, and for producing a second logic level, and for coupling the second logic level to the control input port (320c), when the signal representing that portion of the load current which is to be supplied by the battery is the greater, for thereby causing the switching arrangement (320) to couple the common port (320M) to the first switchable port (320a) when the load current is the larger, and for causing the switching arrangement (320) to couple the common port (320M) to the second switchable port (320b) when the signal representing that portion of the load current which is to be supplied by the battery is the greater. A summing arrangement (338) includes a first input port coupled to the load current sensor (23) and also includes a second input port, for summing together the signal representative of the load current with a signal applied to the second input port of the summing arrangement (338), to thereby produce the desired-source-current signals. A multiplying arrangement (336) is coupled to the common port (320M) of the first switching arrangement (320) and to the second input port of the summing arrangement (338), for multiplying by the load current signals that one of (a) the integrated state-of-charge signals and (b) the signals representing a fixed percentage of the load current which is coupled to the common port (320M) of the first switching arrangement (320).

In a particular embodiment of the invention, the first integrator is a state-limited integrator. In another particular embodiment, the first processing arrangement further includes a limiter (340) coupled to the summing arrangement (338) and to the noninverting input port of the second error signal generator (40), for limiting the desired-source-current signal ($I_{tg}$) applied to the second error signal generator. In yet another embodiment of the invention, the first processing arrangement further includes a source of signal (326) representing the maximum current which is to be drawn from the battery (22), and a multiplier (324) coupled to the summing circuit (322) and to the source of signal representing the maximum current, for multiplying the signal representing that portion of the load current which is to be supplied by the battery (22) by the signal representing the maximum current.

What is claimed is:

1. A method for controlling the state of charge of a battery of a hybrid electric vehicle around a set state of charge which is less than full charge, by controlling an electrical power generator, said method comprising the steps of:

estimating the state of charge of said battery to generate signals representative of the existing state of charge of said battery;

generating signals representative of the desired state of charge of said battery;

taking the difference between said signals representative of the existing (present) state of charge and said signals representative of the desired state of charge to generate state-of-charge error signals;

processing said state-of-charge error signals by at least integrating, to produce desired generator current signals;

sensing the generator current to produce existing generator current signals;

taking the difference between said existing generator current signals and said desired generator current signals to produce generator-current error signals;

processing said generator-current error signals by at least integration to produce a generator output current command; and controlling the electrical current output of said generator in response to said generator output current command.

2. A method according to claim 1, wherein said step of controlling the electrical current output includes the step of controlling the electrical current production of a fuel cell.

3. A method according to claim 1, wherein said step of controlling the electrical current output includes the step of controlling the engine speed of an engine-driven electrical generator.

4. A method according to claim 1, wherein said step of processing said state-of-charge error signals includes the further step of multiplication of said integrated state-of-charge by the vehicle load current to produce multiplied integrated state-of-charge error signals.

5. a method according to claim 4, wherein said step of processing said multiplied integrated state-of-charge error signals includes the further steps of generation of low-battery state signals, and addition of said low-battery state signals to said multiplied integrated state-of-charge error signals.

6. A method according to claim 5, wherein said step of generation of low-battery state signals includes the step of limiting said state-of-charge error signals to produce limited state-of-charge error signals, and multiplying said limited state-of-charge error signals by a gain value.

7. A method according to claim 1, wherein said step of estimating the state of charge of said battery includes the steps of:
 integrating the sum of said existing generator current and said load current.

8. A method according to claim 1, wherein said step of estimating the state of charge of said battery includes the step of measuring the discharge current of said battery, and the step of measuring the battery voltage during said discharge, and the further step of calculating the battery impedance as the quotient of battery voltage divided by battery current.

9. A method according to claim 8, wherein said steps of measuring battery discharge current and battery voltage are carried out in a recurrent manner to thereby produce a time-quantized stream of current and voltage data, and said step of calculating includes the step of averaging said time-quantized stream of voltage and current data over a selected number of time-quantized occurrences.

10. A method according to claim 1, wherein said step of controlling the electrical current output of said generator in response to said generator output current command includes the step of applying said generator output current command signals to control the rotational speed of an internal combustion engine coupled to a rotary electrical generator.

11. A method for controlling the impedance of a battery of a hybrid electric vehicle around a set impedance by controlling an electrical power generator, said method comprising the steps of:
 estimating the impedance of said battery to generate signals representative of the existing impedance of said battery;
 generating signals representative of the desired impedance of said battery;
 taking the difference between said signals representative of the existing impedance and said signals representative of the desired impedance to generate impedance error signals;
 processing said impedance error signals by at least integrating, to produce desired generator current signals;
 sensing the generator current to produce existing generator current signals;
 taking the difference between said existing generator current signals and said desired generator current signals to produce generator-current error signals;
 processing said generator-current error signals by at least integration to produce a generator speed command; and
 controlling the electrical current output of said generator in response to said generator speed command.

12. A method according to claim 11, wherein said step of estimating the impedance of said battery comprises the steps of:
 measuring the battery discharge current to produce first and second current samples at first and second times;
 measuring a voltage related to the battery voltage at said first and second times, to thereby produce first and second battery voltage samples:
  averaging said first and second current samples to produce averaged battery discharge current;
  averaging said first and second battery voltage samples to produce averaged battery voltage; and
  determining the battery impedance as the quotient of said averaged battery voltage divided by said averaged battery discharge current.

13. An apparatus for controlling the charge state of a battery associated with a controllable auxiliary source of electrical power and a load, said apparatus comprising:
 a state-of-charge estimator associated with said battery;
 a load;
 a load current sensor coupled to said load;
 a controllable electrical source;
 a source current sensor coupled to said controllable electrical source, for generating source current signals representing the current generated by said controllable electrical source;
 power conveying means coupled to said battery, said load, and to said controllable electrical source, for allowing power to flow among said load, said battery, and said electrical source;
 a source of signals representing a desired state of battery charge;
 a first error signal generator coupled to said state-of-charge estimator and to said source of signal representing a desired state of battery charge, for taking the difference therebetween, for generating state-of-charge error signals;
 first processing means coupled to said first error signal generator, for processing said state-of-charge error signals by at least integrating said state-of-charge error signals, to thereby produce desired-source-current signals representing the current to be produced by said controllable electrical source;
 second error signal generating means coupled to said first processing means and to said source current sensor, for taking the difference between said desired-source-current signals and said source current signals, to thereby generate source current error signals;
 second processing means coupled to said second error signal generating means, for processing said source current error signals by at least integration, to thereby produce controllable electrical source control signals; and
 coupling means coupled to said second processing means and to said controllable electrical source, for coupling said controllable electrical source control signals to said controllable electrical source for controlling said controllable electrical source.

14. An apparatus according to claim 13, wherein said first processing means comprises:

first switching means including a control port, first and second switchable ports, and a common port to which one of said first and second switchable ports is connected under control of logic signals applied to said control port;

a first path coupled to said first error signal generator and to said first switchable port of said first switching means, said first path including a first integrator for integrating said state-of-charge error signals with a speed controlled by a first constant, to produce first integrated state-of-charge signals;

a source of a constant signal coupled to said second switchable port of said first switching means, said constant signal representing a fixed percentage of the load current, which may be 100% of the load current;

a fast integrator coupled to said first error signal generator for at least integrating said state-of-charge error signals with a speed controlled by a second constant, greater than said first constant of said first integrator, to generate second integrated state-of-charge signals;

a source of signal representing 100% of the load current;

a summing circuit including an inverting input port coupled to said fast integrator and a noninverting input port coupled to said source of signals representing 100% of the load current, for summing the signals applied thereto, to thereby produce signals representing that portion of the load current which is to be supplied by said battery;

signal comparison means coupled to said summing circuit and to said load current sensor, for comparing signals representative of the load current with said signals representing that portion of the load current which is to be supplied by said battery, and for producing a first logic level, and for coupling said first logic level to said control input port of said first switching means when said load current is the greater, and for producing a second logic level, and for coupling said second logic level to said control input port when said signals representing that portion of the load current which is to be supplied by said battery is the greater, for thereby causing said switching means to couple said common port to said first switchable port when said load current is the larger, and for causing said switching means to couple said common port to said second switchable port when said signals representing that portion of the load current which is to be supplied by said battery is the greater;

summing means including a first input port coupled to said load current sensor and also including a second input port, for summing together said signals representative of the load current with signals applied to said second input port of said summing means, to thereby produce said desired source-current-signals;

multiplying means coupled to said common port of said first switching means and to said second input port of said summing means, for multiplying by the load current signals that one of said integrated state-of-charge signals and said signals representing a fixed percentage of the load current which is coupled to said common port of said first switching means.

15. An apparatus according to claim 14, wherein said first integrator is a state-limited integrator.

16. An apparatus according to claim 14, further comprising a limiter coupled to said summing means and to said noninverting input port of said second error signal generator, for limiting said desired-source-current signals applied to said second error signal generator.

17. An apparatus according to claim 14, further comprising:

a source of signals representing the maximum current which is to be drawn from said battery;

a multiplier coupled to said summing circuit and to said source of signals representing the maximum current, for multiplying said signals representing that portion of the load current which is to be supplied by said battery by said signals representing the maximum current.

* * * * *